DROPOUT COMPENSATOR WITH SINGLE-LEVEL SIGNAL STORAGE

INVENTORS
William K. E. Geddes
Eric R. Rout
BY Kemon, Palmer, Stewart & Estabrook
ATTORNEYS Feb. 18, 1969 W. K. E. GEDDES ETAL 3,428,762

DROPOUT COMPENSATOR WITH SINGLE-LEVEL SIGNAL STORAGE

Filed Dec. 8, 1965 Sheet 2 of 2

INVENTORS
William K. E. Geddes
Eric R. Rout
BY Kemon, Palmer, Stewart & Estabrook
ATTORNEYS United States Patent Office 3,428,762
Patented Feb. 18, 1969

3,428,762

DROPOUT COMPENSATOR WITH SINGLE-LEVEL SIGNAL STORAGE

William Keith Elliott Geddes, Kenley, and Eric Raymond Rout, Lower Kingswood, England, assignors to The Marconi Company Limited and Standard Telephones and Cables Limited, London, England Filed Dec. 8, 1965, Ser. No. 512,364
Claims priority, application Great Britain, Dec. 10, 1964, 50,389/64
U.S. Cl. 179—100.2 3 Claims
Int. Cl. G11b *5/04;* H04n *5/78*

The present invention relates to the reproduction of signals from mangetic records and is concerned more especially, but not exclusively, with reproduction of video signals from magnetic tape records.

During playback of video tape recordings, sporadic, momentary loss of the reproduced signal takes place as a result of microscopic blemishes on the tape; these blemishes may interrupt the recording process, the reproducing process, or both. The duration of such a "drop-out" is typically some five or ten micro-seconds. The effect of a drop-out on the output of the recorder depends on the particular circuit arrangements used for recovering the video information from the recorded frequency-modulated signal. In one form of machine the drop-out appears as a peak-white fleck, whereas in another it produces a "blacker-than-black" video signal, which can interfere with synchronisation.

The ill-effects of drop-out can be mitigated by the use of some form of "compensator" which, during the occurrence of a drop-out, replaces the distorted video signal by a substitute signal. This substitute cannot, of course, restore the video information missing from the reproduced signal, but can render its loss less obvious. In a simple known form of compensator the video signal is held at a manually adjustable level during all drop-outs. While some improvement is undoubtedly achieved with a mid-grey substitute signal, it has been found that drop-outs are still very noticeable in areas of high or low means luminance.

A more sophisticated type of compensator has been proposed which incorporates a video delay-line, having a delay of one line-period, which enables the video information from the previous line to be substituted during drop-outs. Such a compensator is, however, expensive.

The present invention has for its principal object to provide reproducing apparatus embodying compensating means which is relatively inexpensive and nevertheless sufficiently effective for many purposes.

According to the present invention there is provided apparatus for the reproduction of signals from magnetic records comprising a pick-up or replay head arranged to generate from a magnetic record an oscillation frequency-modulated by the recorded signals, an amplitude-limiter and a frequency-discriminator arranged substantially to remove amplitude variations from said frequency-modulated signals and to derive and feed to an output terminal the modulation therefrom, means for storing a voltage dependent on the instantaneous amplitude of said modulation, a switching device arranged to interrupt the circuit between the pick-up head and the output terminal, said ouput terminal being then maintained at a voltage derived from said storing means, and means responsive to changes in amplitude of the frequency-modulated signals present before said limiter to actuate said switching device when the amplitude change exceeds a predetermined value.

Figure 1:
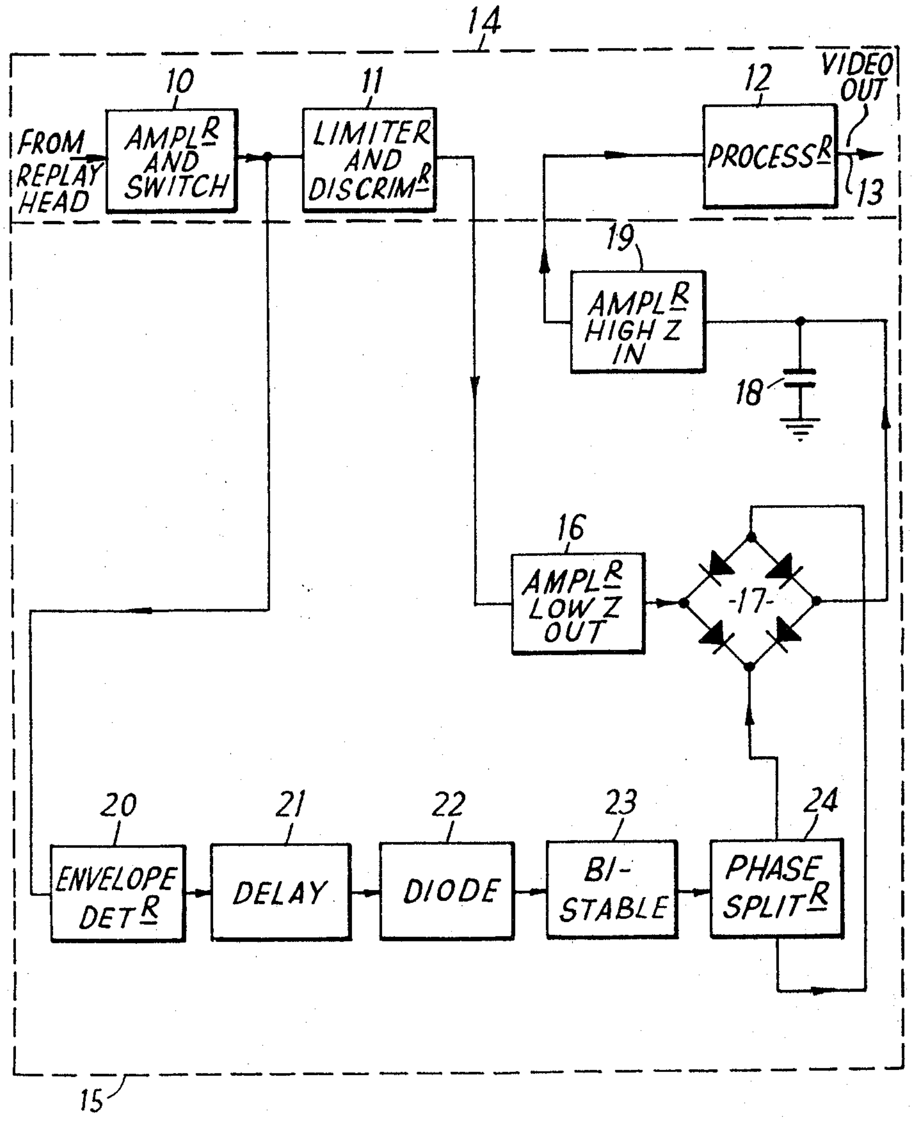
Figure 2:
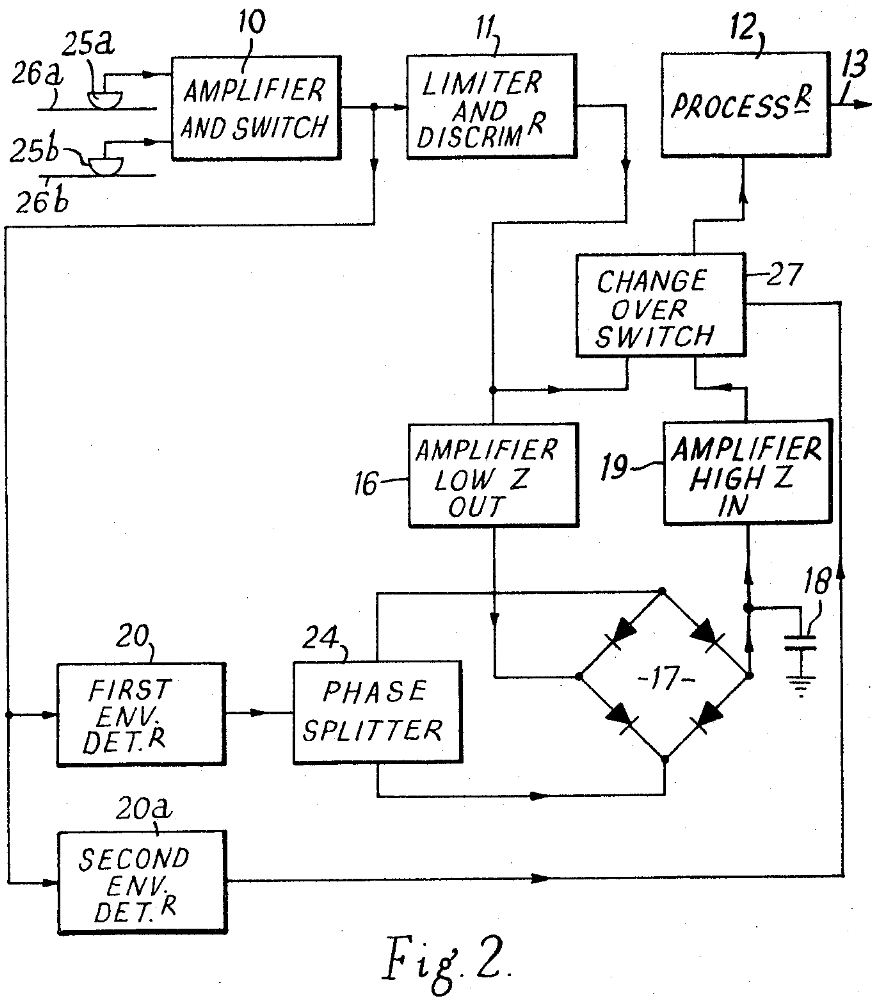

The invention will be described, by way of example, with reference to the accompanying drawings in which FIGS. 1 and 2 are block circuit diagrams of two embodiments of the invention.

Referring to FIG. 1, frequency-modulated R.F. signals from replay heads (not shown) co-operating with a video tape (not shown) are applied to the input of a replay amplifier and head switch 10 (where more than one head is used) and thence to an amplitude-limiter and a frequency-discriminator 11. In a known apparatus the output of the device 11 is fed to processing equipment 12 and thence to an output terminal 13 at which video signals are available. This known equipment is enclosed within a broken line rectangle 14 and the present invention, in this embodiment, adds the equipment within the broken line rectangle 15. This comprises an amplifier 16 having a low output impedance coupled at its input to the output of the device 11 and at its output to a switching device 17 in the form of a diode bridge. The output of the switching device 17 is connected through a capacitor 18 to earth and through an amplifier 19 having a high input impedance to the input of the processing equipment 12.

The frequency-modulated signals from 10, before having their amplitude variations removed, are fed to an envelope detector 20 and thence through circuits 21 and 22 referred to later to a bi-stable device 23. The output of the bi-stable device is fed to a phase-splitter 24 which, when the bi-stable switches over, applies voltages of opposite sign to opposite diagonal points of the bridge 17.

The operation of the circuit is as follows: In the absence of "drop-out," the switching device 17 remains closed and signals are passed with negligible change from the device 11 to the device 12 and thence to the output terminal 13. The capacitor 18 is arranged to have a sufficiently high impedance in relation to the output impedance of the amplifier 16 and the impedance of the switching device 17 not to introduce distortion. When a "drop-out' occurs, the amplitude of the frequency-modulated signals from 10 changes and the D.C. component of the amplitude change derived in 20 is arranged to cause the bi-stable device 23 to change from its one stable state to the other. The voltages thereby generated and applied to the switching device 17 open this switching device and interrupt the passage of signals to the output terminal 13. The capacitor 18 can then discharge only through the high input impedance of the amplifier 19. The time constant of this combination of input impedance and capacitance may be made many times the duration of a "drop-out" and the signal at 13 is maintained at an almost constant level until the bi-stable device 23 reverts to its original state when the voltage from 20 falls.

The operation of the bi-stable circuit 23 must be carefully timed with respect to the moments at which the amplitude level of the frequency-modulated signal changes, in order that the compensator shall cause the minimum loss of video information consistent with removal of the effects of the "drop-outs." Because of the delay present in the limiter and discriminator 11, a compensating delay is used, as represented by the device 21 (which may be a resistance/capacitance network) in the circuit coupling the envelop detector 20 to the bi-stable circuit 23. The characteristics of the limiter and discriminator 11 may be such as to require that the compensator operate for an interval two to three microseconds longer than the duration of a "drop-out." This may be because the first two to three microseconds of video signal to emerge after the end of each "drop-out" is badly distorted. It may therefore be found necessary to arrange that the interval between failure of the frequency-modulated signal and open-circuiting of the diode switch 17 is shorter than the interval between restoration of the signal and reclosure of the switch. This may be achieved by introducing a diode 22 into the circuit coupling the envelope detector 20 to the bi-stable 23. A further consequence of this necessity to extend the effective duration of a drop-out by two to three microseconds is that it may be advisable to ensure that the compensator is not actuated by very short drop-outs, such as those resulting from scratched tape, nor by the momentary discontinuities that accompany head-switching when multiple heads are used. As is known the head switches serve to combine the outputs of the two or more heads (which rotate and operate sequentially) into a continuous signal.

It may be found preferable, with small drop-outs, to maintain a direct path from the head switch to the processor and to interrupt this path and allow the storage capacitor to supply the output only when larger drop-outs occur. This can be achieved with the embodiment shown in FIG. 2 in which like parts have the same references as in FIG. 1. The principal difference is that in the arrangement of FIG. 2, so long as any drop in the video signal is small (e.g. less than 6 db) the video signal passes through a changeover switch 27 from the limiter and discriminator 11 to the processor 12. Under these conditions the voltage across the capacitor 18 follows the video signal from the limiter 11 because the diode switch 17 is conducting. However, when the drop in the video signal exceeds 6 db the switch 17 is opened, as in the embodiment of FIG. 1, and the storage capacitor 18 receives no further charge and remains charged to the level that it had before the drop. If there should be a subsequent large drop (e.g. 30 db) the change-over switch 27 is operated by a control signal supplied thereto through a second envelope detector 20*a*. The effect of this is that the voltage applied to the processor 12 is then that of the capacitor 18 until the signal level recovers at the end of the drop-out.

FIGURE 2 also shows diagrammatically two replay heads 25*a* and 25*b* co-operating respectively with two magnetic tapes 26*a* and 26*b* and selectively switched into operation by means of the switch 10.

The use of two detectors 20 and 20*a*, each with its own threshold level, permits independent control of the sampling of the video signal and of its replacement by the substitute signal. The fall of R.F. level at the beginning of a drop-out is not instantaneous, but typically extends over a period of the order of a microsecond. The threshold level of the first detector 20 is set to a value only a few decibels below normal, and the video waveform is therefore sampled before it begins to exhibit distortion due to the drop-out. When drop-outs correspond to an ultimate fall of, say, 15 to 25 db in R.F. amplitude, the limiter 11 in the recorder effectively restores the video signal after an initial burst of distortion and, the uncompensated video signal is then subjectively preferable to the substitute signal. The threshold of the second detector 20*a* is therefore set to operate the change-over switch 27 only when the R.F. level falls below that at which the limiters fail; by choosing the threshold in this way the substitute signal is used only when it is subjectively preferable to the signal it replaces.

We claim:

1. Apparatus for the reproduction of signals from magnetic records, comprising a replay head for generating from a magnetic record an oscillation frequency-modulated by recorded signals, an amplitude limiter coupled to said replay head and adapted to remove amplitude variations from said frequency-modulated oscillation, a frequency discriminator coupled to said amplitude limiter for deriving a modulation signal from said frequency-modulated oscillation from said amplitude limiter, an output terminal for receiving said modulation signal, means coupling said frequency discriminator to said output terminal, storage means for storing a voltage dependent on the instantaneous amplitude of said modulation signal, switch means included in said coupling means, and means for operating said switch means between two conditions in dependence upon the signal level at a part of said apparatus preceding said amplitude limiter, said switch means in one of said conditions causing said modulation signal to be applied to said output terminal and in the other of said conditions causing the voltage at said output terminal to be determined by the voltage in said storage means.

2. Apparatus for the reproduction of signals from magnetic records, comprising a replay head for generating from a magnetic record an oscillation frequency-modulated by recorded signals, an amplitude limiter coupled to said replay head and adapted to remove amplitude variations from said frequency-modulated oscillation, a frequency discriminator coupled to said amplitude limiter for deriving a modulation signal from said frequency-modulated oscillation from said amplitude limiter, an output terminal for receiving said modulation signal, means coupling said frequency discriminator to said output terminal, storage means coupled to said output terminal for storing a voltage dependent on the instantaneous amplitude of said modulation signal, switch means included in said coupling means, and means responsive to a change in amplitude of said frequency-modulated oscillation from said replay head exceeding a predetermined value to operate said switch means and interrupt the application of said modulation signal to said output terminal, the voltage on said output terminal being then determined by the voltage in said storage means.

3. Apparatus for the reproduction of signals from magnetic records, comprising a replay head for generating from a magnetic record an oscillation frequency-modulated by recorded signals, an amplitude limiter coupled to said replay head and adapted to remove amplitude variations from said frequency-modulated oscillation, a frequency discriminator coupled to said amplitude limiter for deriving a modulation signal from said frequency-modulated oscillation from said amplitude limiter, an output terminal for receiving said modulation signal, means coupling said frequency discriminator to said output terminal, storage means for storing a voltage dependent on the instantaneous amplitude of said modulation signal, first switch means connected between said frequency discriminator and said storage means, means to operate said first switch means to interrupt the application of said modulation signal to said storage means in response to the amplitude of said frequency-modulated oscillation changing by more than a first predetermined amount, second switch means connected between said frequency discriminator, said storage means and said output terminal and in a first condition coupling said frequency discriminator to said output terminal and in a second condition coupling said storage means to said output terminal, and means responsive to a change in the amplitude of said frequency-modulated oscillations exceeding a second predetermined amount, greater than the first predetermined amount, for operating said second switch means from said first condition to said second condition.

References Cited

UNITED STATES PATENTS 3,328,521 6/1967 Moskovitz ____________ 178—6.6

ROBERT L. GRIFFIN, *Primary Examiner.*

H. W. BRITTON, *Assistant Examiner.*

U.S. Cl. X. R.

178—6.6